(12) United States Patent
Ohara et al.

(10) Patent No.: US 10,511,666 B2
(45) Date of Patent: *Dec. 17, 2019

(54) OUTPUT DATA PROVIDING SERVER AND OUTPUT DATA PROVIDING METHOD

(71) Applicant: Sony Interactive Entertainment Inc., Tokyo (JP)

(72) Inventors: Kazuki Ohara, Tokyo (JP); Kazushi Yoshida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,756

(22) Filed: Aug. 10, 2018

(65) Prior Publication Data

US 2018/0352035 A1 Dec. 6, 2018

Related U.S. Application Data

(63) Continuation of application No. 14/890,154, filed as application No. PCT/JP2013/003699 on Jun. 12, 2013, now Pat. No. 10,075,525.

(51) Int. Cl.
*H04L 29/06* (2006.01)
*H04L 29/08* (2006.01)
(Continued)

(52) U.S. Cl.
CPC ........ *H04L 67/1097* (2013.01); *A63F 13/335* (2014.09); *A63F 13/355* (2014.09);
(Continued)

(58) Field of Classification Search
CPC .................................................. H04L 67/1097
See application file for complete search history.

(56) References Cited

U.S. PATENT DOCUMENTS 6,475,090 B2   11/2002   Roelofs
7,004,839 B2   2/2006   Suzuki
(Continued)

FOREIGN PATENT DOCUMENTS

CN   1460031 A   12/2003
CN   1759909 A   4/2006
(Continued)

OTHER PUBLICATIONS

Extended European Search Report for corresponding EP Application No. 19150241.8, 16 pages, dated Apr. 23, 2019.
(Continued)

*Primary Examiner* — Adnan M Mirza
(74) *Attorney, Agent, or Firm* — Matthew B. Dernier, Esq.

(57) ABSTRACT

An input information reception unit of a server receives input information relating to a user operation from a client terminal and records the input information into an input information storage unit together with time. An information processing unit carries out an information process immediately on the basis of the input information, and an encoding unit encodes generated primary output data and a data transmission unit transmits the encoded data to the client terminal. An adjustment part adjusts processing contents and an encode parameter at any time in response to a communication situation monitored by a communication situation monitoring unit and records an adjustment history into an adjustment history storage unit together with the time.

12 Claims, 13 Drawing Sheets

(51) Int. Cl.
A63F 13/355 (2014.01)
A63F 13/497 (2014.01)
A63F 13/86 (2014.01)
A63F 13/358 (2014.01)
A63F 13/67 (2014.01)
A63F 13/46 (2014.01)
A63F 13/335 (2014.01)

(52) U.S. Cl.
CPC ............ *A63F 13/358* (2014.09); *A63F 13/46* (2014.09); *A63F 13/497* (2014.09); *A63F 13/67* (2014.09); *A63F 13/86* (2014.09); *H04L 67/38* (2013.01); *H04L 67/42* (2013.01)

(56) References Cited

U.S. PATENT DOCUMENTS

| | | | |
|---|---|---|---|
| 7,458,894 | B2 | 12/2008 | Danieli |
| 7,803,054 | B1 | 9/2010 | Ogus |
| 8,366,552 | B2 | 2/2013 | Perlman |
| 8,805,920 | B2 | 8/2014 | Fujiwaka |
| 9,792,950 | B2 | 10/2017 | Suzuki |
| 2002/0142843 | A1 | 10/2002 | Roelofs |
| 2003/0050118 | A1 | 3/2003 | Suzuki |
| 2006/0058103 | A1 | 3/2006 | Danieli |
| 2008/0096663 | A1 | 4/2008 | Lieberman |
| 2009/0253507 | A1 | 10/2009 | Ishii |
| 2009/0318232 | A1 | 12/2009 | Harris |
| 2010/0167816 | A1 | 7/2010 | Perlman |
| 2012/0014658 | A1 | 1/2012 | Suzuki |
| 2012/0306933 | A1 | 12/2012 | Osako |
| 2013/0182186 | A1 | 7/2013 | Ikenaga |

FOREIGN PATENT DOCUMENTS

| | | | |
|---|---|---|---|
| CN | 102428483 | A | 4/2012 |
| EP | 1637197 | A1 | 3/2006 |
| JP | 2002028373 | A | 1/2002 |
| JP | 2007274443 | A | 10/2007 |
| JP | 2009157771 | A | 7/2009 |
| JP | 2009247564 | A | 10/2009 |
| JP | 2010020159 | A | 1/2010 |
| JP | 2010214028 | A | 9/2010 |
| JP | 2012090120 | A | 5/2012 |
| WO | 2005061067 | A1 | 7/2005 |

OTHER PUBLICATIONS

Zander S et al: "Achieving Fairness in Multiplayer Network Games through Automated Latency Balancing". Proceedings of the 2005 ACM SIGCHI International Conference on Advances in Computer Entertainment Technology. vol. 265, pp. 117-124 (Jun. 15, 2005).

Japanese Patent Office Action on Patentability for Japanese App. No. JP 2015-522256, 10 pages, dated Jul. 11, 2017.

State Intellectual Property Office of the P .R.C. action on patentability in counterpart Chinese App. No. 201380077217.6, 25 pages, dated Jul. 19, 2017.

Sebastian Zander et al., "Achieving Fairness in Multiplayer Network Games through Automated Latency 1 Balancing," Proceedings of the 2005 ACM SIGCHI International Conference on Advances in Computer Entertainment Technology, Jun. 15, 2005, pp. 117-124, 8 pages, ACM, New York, NY.

Extended European Search Report from counterpart European Pat. App. No. 13886662.9, 18 pages, dated May 8, 2017.

International Search Report from International Application No. PCT/JP2013/003699 dated Jul. 9, 2013.

International Preliminary Report on Patentability from International Application No. PCT/JP2013/003699 dated Dec. 23, 2015.

International Preliminary Report on Patentability from International Application No. PCT/JP2013/003699 dated Dec. 23, 2015 (English Translation).

Office Action for related U.S. Appl. No. 14/890,154, 10 pages, dated Sep. 15, 2017.

FIG.4

| TIME | INPUT VALUE |
|---|---|
| 00:00:00 | – |
| 00:00:42 | #04 |
| 00:00:58 | #04 |
| 00:01:08 | #03 |
| 00:01:39 | #04 |
| ... | ... |

OUTPUT DATA PROVIDING SERVER AND OUTPUT DATA PROVIDING METHOD

CROSS REFERENCE TO RELATED APPLICATIONS

This is a continuation application of U.S. patent application Ser. No. 14/890,154, allowed, accorded a filing date of Nov. 9, 2015; which claims priority to International Patent Application No. PCT/JP2013/003699, filed on Jun. 12, 2013, the entire disclosure of which is hereby incorporated by reference.

TECHNICAL FIELD

The present invention relates to a technology which utilizes a network to provide a service of information processing.

BACKGROUND ART

Thanks to development of information processing technologies and enrichment of networks in recent years, it has become possible to implement various information processes through cooperation with a server without depending upon performances or use environments of an apparatus operated by a user such as a personal computer, a portable terminal or the like. For example, a technology has been proposed wherein a terminal operated by a user and an information processing apparatus for carrying out information processing associated with the terminal are separated from each other such that even a portable terminal of a simple configuration can output advanced information (refer, for example, to PTL 1). A technical trend to make it possible to implement, by utilizing various services provided by a server through a network like crowd computing, advanced information processing and huge data management without depending upon the environment in which the user is placed is increasing more and more.

CITATION LIST

Patent Literature

Japanese Patent Laid-Open No. 2010-20159

DISCLOSURE OF THE INVENTION

Problem to be Solved by the Invention

In such a technology as described above, it becomes more difficult, in comparison with processing in a single information processing apparatus, to satisfy both of the quality of output data such as an image to be displayed on the terminal side and the responsiveness after an operation till outputting. In particular, since a communication band between a terminal and a server is added as a variable parameter, in order to maintain the responsiveness without depending upon the variation of the communication situation, it inevitably becomes necessary to sufficiently reduce the picture quality and normally suppress the data size. In an information process in which the responsiveness is particularly significant in a game or the like, the maintenance of the responsiveness becomes particularly significant in order to avoid such a problem that, although an operation is carried out at an appropriate timing, it is determined as an operation error, and this gives rise to a dilemma that the quality of output data must be sacrificed.

The present invention has been made taking such a subject as just described into consideration, and it is an object of the present invention to provide a technology which can satisfy both of the responsiveness and the quality of output data in an environment in which a server provides an information processing service through a network.

Means to Solve the Problem

A mode of the present invention relates to an output data providing server. The output data providing server is an output data providing server which connects to a client terminal through a network and receives information relating to a user operation on the client terminal to carry out an information process and then transmits output data obtained as a result of the information process to the client terminal which requests the output data, including an input information reception unit configured to acquire information relating to the user operation as input information, an input information storage unit configured to store a history of the input information, an information processing unit configured to immediately carry out an information process on a basis of the input information acquired by the input information reception unit to generate primary output data to be transmitted in response to the user operation and carry out an information process for the second time on a basis of the history of the input information read out from the input information storage unit to re-generate output data as secondary output data, an output data storage unit configured to store the secondary output data, and a data transmission unit configured to transmit the primary output data generated by the information processing unit or the secondary output data read out from the output data storage unit to the client terminal in accordance with a request.

Also another mode of the present invention relates to an output data providing server. The output data providing server is an output data providing server which connects to a client terminal through a network and receives information relating to a user operation on the client terminal to carry out an information process and then transmits output data obtained as a result of the information process to the client terminal which requests the output data, including an input information reception unit configured to acquire information relating to the user operation as input information, an information processing unit configured to carry out an information process on a basis of the input information to generate output data, and a data transmission unit configured to transmit the output data to the client terminal. The information processing unit adaptively adjusts at least one of contents of the information process and quality of the output data in response to a communication situation with the client terminal.

A further mode of the present invention relates to an output data providing method. The output data providing method is an output data providing method wherein a server connects to a client terminal through a network and receives information relating to a user operation on the client terminal to carry out an information process and then transmits output data obtained as a result of the information process to the client terminal which requests the output data, including a step of acquiring information relating to the user operation as input information, a step of storing a history of the input information into a memory, a step of immediately carrying out an information process on a basis of the input information to generate primary output data to be transmitted in response to the user operation and transmitting the generated data to the client terminal, a step of carrying out an information process for the second time on a basis of the history of the input information read out from the memory to re-generate output data as secondary output data and storing the secondary output data into a storage apparatus, and a step of transmitting the secondary output data read out from the storage apparatus to the client terminal in accordance with a request.

Also a still further mode of the present invention relates to an output data providing method. The output data providing method is an output data providing method wherein a server connects to a client terminal through a network and receives information relating to a user operation on the client terminal to carry out an information process and then transmits output data obtained as a result of the information process to the client terminal which requests the output data, including a step of acquiring information relating to the user operation as input information, a step of carrying out an information process on a basis of the input information to generate output data, and a step of transmitting the output data to the client terminal. The step of generating the output data adaptively adjust at least one of contents of the information process and quality of the output data in response to a communication situation with the client terminal.

It is to be noted that also arbitrary combinations of the constituent elements described above and the representations of the present invention obtained by conversion thereof between a method, an apparatus, a system, a computer program and so forth are effective as modes of the present invention.

Advantage of the Invention

With the present invention, service provision of information processing through a network can be carried out in an optimum state in response to a situation.

BRIEF DESCRIPTION OF THE DRAWINGS

FIG. 4 is a view depicting an example of a data structure of an input information file stored in an input information storage unit in the present embodiment;

BEST MODE FOR CARRYING OUT THE INVENTION

Figure 1:
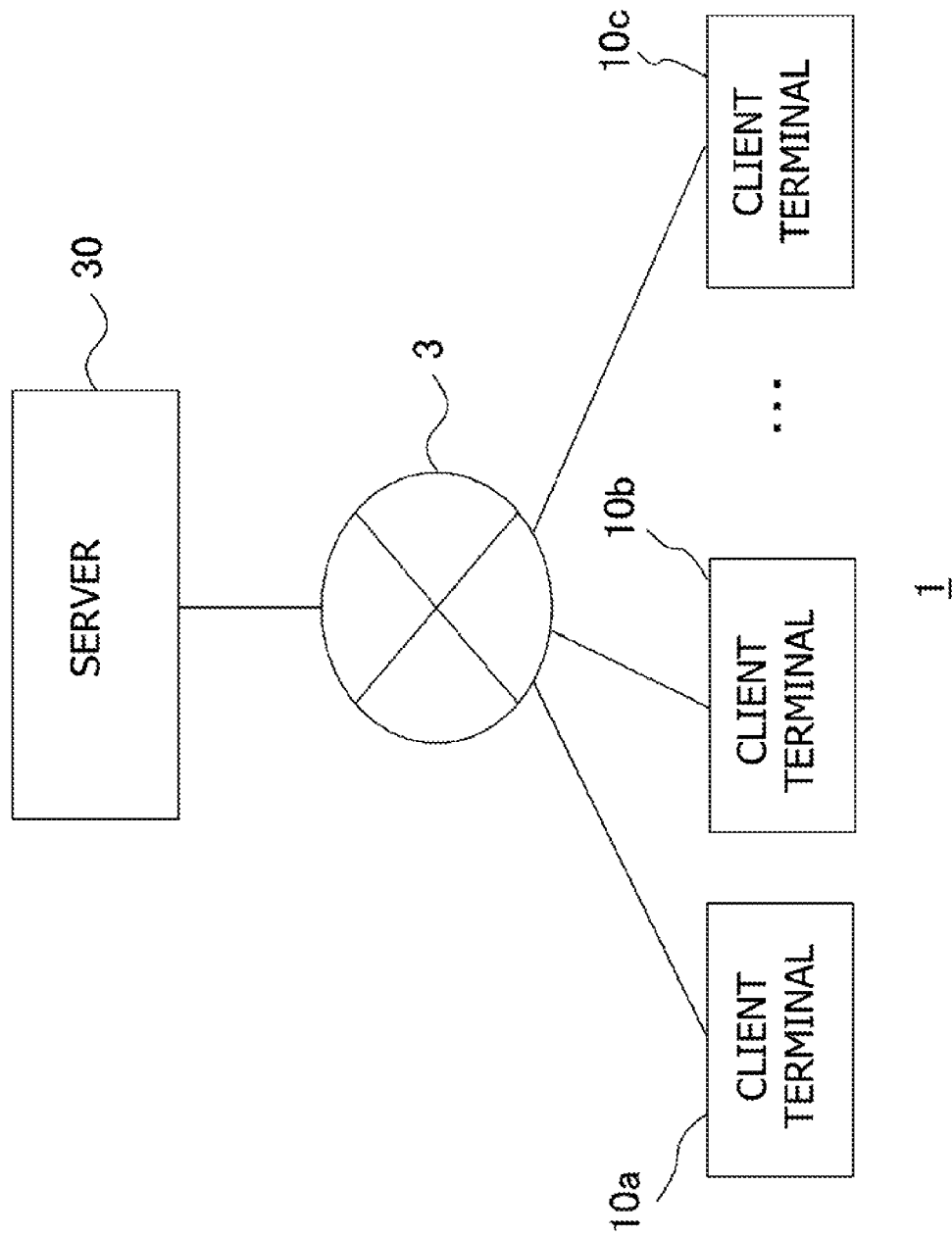
FIG. 1 is a view depicting a configuration of an information processing system according to an embodiment.

FIG. 1 depicts a configuration of an information processing system according to an embodiment. In an information processing system 1, client terminals 10a, 10b, and 10c are configured for connection to a server 30 through a network 3 and carry out transfer of data to and from the server 30. The server 30 carries out information process in response to a request from the client terminal 10a, 10b, or 10c and transmits output data generated as a result of the information process to the client terminal 10a, 10b, or 10c. The client terminals 10a, 10b, and 10c and the server 30 establish a connection by wire connection or wireless connection to the network 3. To the connection technique between the client terminals 10a, 10b, and 10c and the server 30 and for the procedure for requesting for information process and transfer of output data, generally available technologies can be applied.

The client terminals 10a, 10b, and 10c are apparatus which are operated by respective users. Each of the client terminals 10a, 10b, and 10c transmits an operation carried out by a user thereof as input information to the server 30, issues a request for an information process corresponding to the input information, and outputs output data generated as a result of the information process carried out by the server 30 as an image or sound. The client terminals 10a, 10b, and 10c may each be any of general apparatus and terminals such as a tablet, a portable telephone set, a portable terminal, or a personal computer. It is to be noted that the number of the client terminals 10a, 10b, and 10c and server 30 to be connected to the network 3 is not limited particularly. In the following description, the client terminals 10a, 10b, and 10c are collectively referred to as client terminals 10.

Although the information process requested to the server 30 by the client terminals 10 is not limited particularly, in the following described, a mode for implementing a game is described principally. In particular, the server 30 starts up a game designated by a user on any client terminal 10 and progresses the game in accordance with an operation of the user on the client terminal 10. Then, the server 30 successively transmits output data such as an image or sound of the game generated in response to the progress of the game to the client terminal 10. The client terminal 10 successively converts the output data transmitted thereto from the server 30 into data of a form in which the data can be outputted by decoding or the like and then outputs the data as an image or sound.

Consequently, a game screen image and sound corresponding to the operation of the user are outputted from the client terminal 10. It is considered that this configuration provides a service for transmitting data of a moving picture, whose contents are changed in response to an operation of the user, as contents data. However, the information process to be carried out by the server 30 may be not a game but any of general information processes such as communication tools such as document creation, image rendering, or an electronic bulletin board. Further, in the description given below, it is assumed that the output data is data of a moving picture configured from an image frame sequence successively generated with respect to the time axis. However, the output data may further include sound data.

The server 30 further transmits the same image data to a plurality of client terminals 10 so that the plurality of users can share the image data. For example, if the information process to be carried out is a network game in which a plurality of users can participate, the server 30 successively receives information relating to operations of the respective users from the plurality of client terminals 10 and reflects the received information on the progress of the game. Then, generated image data of the game are all transmitted to the client terminals 10 to implement a competitive game further.

In this manner, in the present embodiment, the information processing system is configured basically such that the server 30 successively receives input information representative of operation contents of the users on the client terminals 10 irrespective of the number of the client terminals 10, generates image data on the real time basis and transmits the image data to the client terminals 10 so that an image corresponding to an operation is displayed on the client terminals 10. Further, the server 30 transmits the generated image data not only to the users who participate in the game but also to the client terminals 10 of users who merely want to watch the game or users who want to appreciate the manner of the game later. By this, an own game play or a game play of a different person can be shared by a plurality of users irrespective of the time and the place.

In such a mode as described above, in a game in which the frequency of operations by users is high or in which the operation timing relates to a score, high stress is provided to a user by a variation in responsiveness which depends upon a communication situation in the network 3. Also it may sometimes occur that deterioration of the communication situation gives rise to such a disadvantage that an image stops or frame dropping occurs. This problem is actualized as the quality of an image or data after compression becomes high.

Therefore, in the present embodiment, the highest rank is provided, during execution of a game, to the responsiveness of image display to moderate the stress relating to an operation of a user who is a player. In particular, the picture quality is suppressed to some degree while the robustness is provided to the variation of the communication situation. On the other hand, the picture quality is prioritized making use of the fact that, at a stage at which a moving picture is published after an end of the game, there is no operation and the responsiveness is not demanded. In order to implement this, the server 30 executes, after the game end, the game again similarly as in an actual game play to re-generate image data. Consequently, high quality is guaranteed for image data upon publication. In the description given below, image data generated on the real time basis in response to an operation of a user is referred to as "primary data," and image data re-generated after the game end is referred to as "secondary data."

Figure 2:
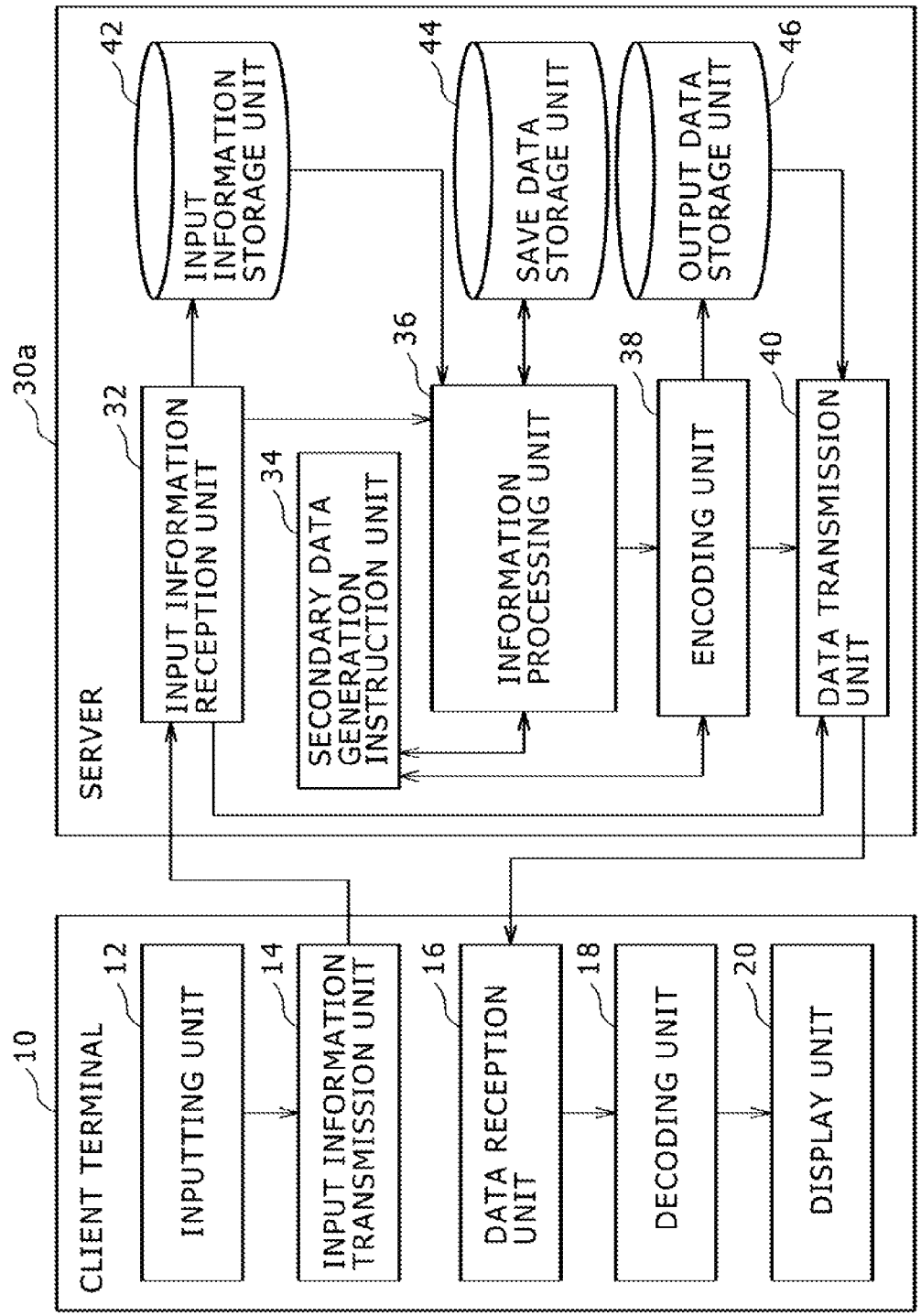
FIG. 2 is a view depicting a configuration of a client terminal and a server in the present embodiment in more detail.

FIG. 2 depicts a configuration of the client terminals 10 and the server 30 more particularly. In order to make distinction from the servers 30 hereinafter described possible, in FIG. 2, the server is represented as server 30a. Each client terminal 10 includes an inputting unit 12 which accepts a user operation, an input information transmission unit 14 which transmits contents of the accepted operation as input information to the server 30, a data reception unit 16 which receives image data transmitted thereto from the server 30, a decoding unit 18 which decodes the image data, and a display unit 20 which displays an image.

The server 30a includes an input information reception unit 32 which receives input information by a user from a client terminal 10, an information processing unit 36 which carries out information process of a game or the like requested from the client terminal 10, an encoding unit 38 which encodes data of an image generated as a result of the image processing, and a data transmission unit 40 which transmits image data after encoding to the client terminal 10.

The server 30a further includes an input information storage unit 42 which stores input information from the client terminals 10 in association with input time, a save data storage unit 44 which stores, when a user saves and interrupts a game, information relating to the save, a secondary data generation instruction unit 34 which instructs the information processing unit 36 and the encoding unit 38 to generate secondary data, and an output data storage unit 46 which stores image data of primary data and secondary data.

Figure 7:
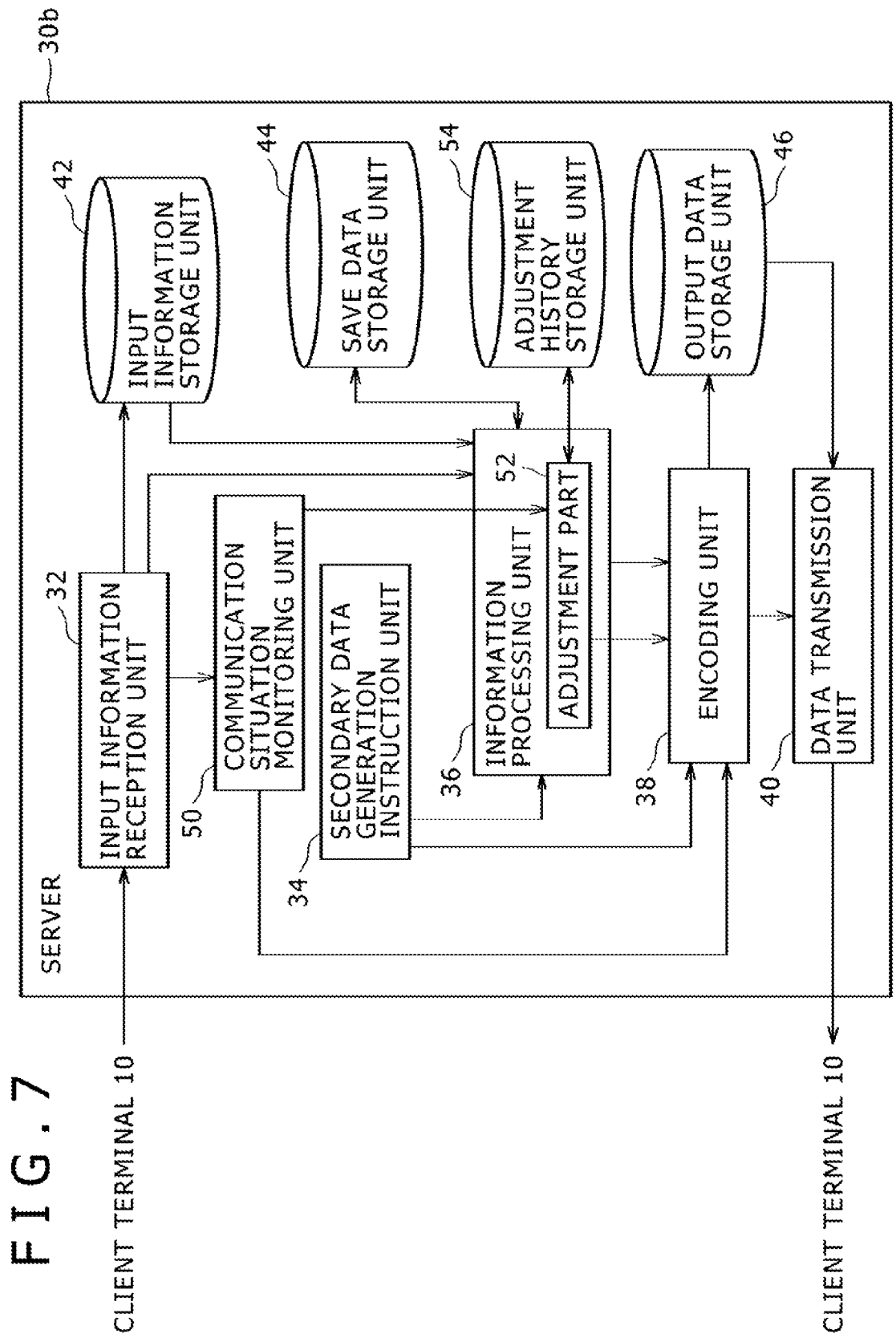
FIG. 7 is a view particularly depicting a configuration of the server which further includes a function of adjusting an information process and an encoding process in response to a communication situation within a game execution period in the present embodiment.

Referring to FIG. 2 and FIG. 7 which is hereinafter described, elements described as functional blocks which carry out various processes can be configured, in hardware, from a central processing unit (CPU), a memory, and other LSIs and are implemented, in software, a program and so forth stored in a recording medium or a storage apparatus and loaded in the memory. Accordingly, it can be recognized by those skilled in the art that the functional blocks can be implemented in various forms only from hardware, only from software, or from a combination of hardware and software and are not restricted to any of them.

The inputting unit 12 of the client terminal 10 is inputting means by a user for designating a game to be requested to the server 30, carrying out an operation for the game, or inputting a command and is implemented from at least one of general inputting apparatus such as a game pad, a button, a touch panel, a keyboard, a mouse, and a joystick. The input information transmission unit 14 establishes communication with the server 30 by a general technique, generates a signal of input information representative of operation contents of a user for the inputting unit 12 and transmits the signal to the server 30.

The input information reception unit 32 of the server 30 receives input information transmitted thereto from any client terminal 10. The information processing unit 36 carries out information process of a game or the like in accordance with the input information received by the input information reception unit 32. As described hereinabove, input information is successively transmitted from one or a plurality of client terminals 10 and the information processing unit 36 progresses information process on the real time basis in response to the input information. By immediately transmitting the input information from the input information transmission unit 14 of any client terminal 10 to the input information reception unit 32 and the information processing unit 36 of the server 30, information process is carried out in such a manner that the information process is being carried out in the inside of the client terminal 10.

To a particular protocol or the format and an interpretation method of an input signal, a general emulation technology can be applied, and therefore, description of them is omitted herein. The input information reception unit 32 stores information similar to input information supplied to the information processing unit 36 as an input information file, in which the information is associated with input times, into the input information storage unit 42. The input information file is generated for each game play and associated with identification information of the game play. Here, the identification information of a game play is information provided uniquely to the game play in order to generate secondary data or specify a transmission target to a client terminal 10 and is shared in the server 30a. The input time is used to trace timings of operations after starting of a game when secondary data are generated, and therefore, may be any of an elapsed period of time after starting of a game, a time point representative of the standard time, a time interval after the immediately preceding operation and so forth.

The information processing unit 36 successively generates image data of a game as primary data within a game execution period after the start of the game till the end of the game and supplies the image data to the encoding unit 38. The image data may be general moving picture data having a predetermined frame rate or may be such data at irregular time intervals that they include still pictures and moving pictures in a mixed manner. Further, the end of the game may be at a point of time of so-called game over at which the game ends in accordance with settings of the game or a point of time at which the user carries out an operation for saving data till then and interrupting the game midway of the game.

In the latter case, the information processing unit 36 stores save data, particularly a reaching point (save point) of the game, a score at the point of time and so forth, into the save data storage unit 44 in an associated relationship with the identification information of the game play. If the user carries out a request for re-starting the game from the save point till then, then the information processing unit 36 reads out the save data associated with the identification information of the pertaining game play from the save data storage unit 44 and starts processing of the game with the save data. Therefore, a mechanism for specifying identification information of a game play by the server 30 on the basis of identification information of the game of the target of re-starting by the client terminal 10 is provided.

As the simplest mechanism, the identification information itself of a game play may be configured from information unique to the game play and recognizable by a person such as the identification information of a user who is a player or of a client terminal, the name of the game, the last save time and so forth so as to allow direct selection by the user. However, it can be recognized to those skilled in the art that various other forms can be assumed. It is to be noted that the save point is an end point of the game play till then and also is a start point of the re-started game play. Therefore, in order to prepare for generation of secondary data, the save point is associated also with the latter identification information of the game play.

The information processing unit 36 further reproduces the game play carried out formerly, generates image data of the game as secondary data again and supplies the secondary data to the encoding unit 38. Therefore, the secondary data generation instruction unit 34 decides the processing capacity of the information processing unit 36 and the encoding unit 38, namely, decides whether or not there are sufficient rooms in resources such as the CPU time or the memory capacity, in accordance with a predetermined criterion. Then, if the secondary data generation instruction unit 34 decides that there are sufficient rooms, then the secondary data generation instruction unit 34 instructs the information processing unit 36 and the encoding unit 38 to start generation of secondary data.

The generation process of secondary data is carried out basically after the game play of the secondary data generation target comes to an end. However, if there is a room in resources, then secondary data may in some cases be generated in parallel to the game play being carried out. Depending upon the processing capacity of the information processing unit 36 or the encoding unit 38, some other game or games may be carried out in parallel.

The secondary data generation instruction unit 34 retains identification information of a game play, whose secondary data have not been generated as yet, into an internal memory. Then, if it is decided that there is a room in resources, then the secondary data generation instruction unit 34 selects a game play of a secondary data generation target in accordance with a predetermined rule such as first in first out (FIFO) and notifies the information processing unit 36 of identification information of the game play. The information processing unit 36 reads out a corresponding input information file on the basis of the received identification information of the game play from the input information storage unit 42. Further, if the pertaining game play is re-starting from the save point, then the information processing unit 36 reads out the corresponding save data from the save data storage unit 44.

Then, when the save data are read out, processing of the game is started from the save point, but in any other case, processing of the game is started from the beginning. After the game is started, the game is reproduced by carrying out a process in response to the input information at a timing corresponding to the time at which the input information was recorded. However, upon secondary data generation, there is no necessity to immediately transmit the data to the client terminal 10, and therefore, processing may be carried out over a period by elongating the time axis to a predetermining magnification or the like. Further, from the same reason, secondary data may be generated with picture quality higher than that of the primary data. For example, at least one of the spatial resolution and the temporal resolution of an image may be made higher than that of the primary data.

However, depending upon settings, the quality of the secondary data may not necessarily be higher than that of the primary data. For example, as hereinafter described, in such a case that the responsiveness of the game takes precedence upon generation of primary data and the quality is adjusted in response to a communication situation, even if the quality is same in the basic settings, since such adjustment is not carried out upon generation of secondary data, the stability and the reliability of the quality can be substantially improved. Further, the secondary data may be generated with a plurality of resolutions depending upon the assumed size of the display of the client terminal 10.

The encoding unit 38 encodes primary data or secondary data supplied thereto from the information processing unit 36. Also in the encoding unit 38, the responsiveness takes precedence for the primary data, and the quality of data takes precedence for the secondary data. For example, upon generation of secondary data, the bit rate is set higher than that upon generation of the primary data. Also it is possible to raise the compression ratio together with the quality by setting the processing time period longer. When output data from the information processing unit 36 are successively encoded, the supplying timing of output data may be adjusted by elongating the time axis of the information process in a corresponding relationship to the time taken for the encoding.

The encoding unit 38 successively supplies encoded primary data to the data transmission unit 40 and successively stores the encoded primary data into the output data storage unit 46 in an associated relationship with the identification information of the game play. Further, when secondary data are encoded, the encoding unit 38 stores the encoded secondary data into the output data storage unit 46 in an associated relationship with the identification information of the game play. If the necessary for primary data is lost because secondary data of the same game play are generated, then the primary data may be deleted from the output data storage unit 46.

It is to be noted that the primary data generated by the information processing unit 36 may be stored directly into the output data storage unit 46. In this case, the primary data before the encoding may be stored as secondary data into the output data storage unit 46 after they are encoded by the encoding unit 38 while the bit rate is raised or a longer processing time period is taken. Also this process may be carried out within a period of time within which there is a room in resources of the encoding unit 38. Even with this, data of high quality and of a high compression ratio can be generated from primary data transmitted giving priority to the responsiveness within a game execution time period. Further, data obtained by further improving the quality of image data obtained when the information processing unit 36 reproduces the game as described hereinabove may be stored as tertiary data.

The data transmission unit 40 successively transfers primary data supplied thereto from the encoding unit 38 within a game execution period to the client terminal 10. A particular transfer process can be implemented by applying a general technology. The data transmission unit 40 further transmits image data of a requested game play read out from the output data storage unit 46 in response to a request from the client terminal 10 after the game end or the like. At this time, if secondary data of the game play are stored already in the output data storage unit 46, then the data transmission unit 40 transmits the secondary data, but if the secondary data are not stored as yet, then the data transmission unit 40 transmits the primary data.

The data reception unit 16 of the client terminal 10 receives the image data transmitted thereto from the server 30*a*. The decoding unit 18 decodes and decompresses the received image data and develops them as an image into a frame memory not depicted. Since it is considered that parameters upon decoding may be different depending upon whether the transmitted image data are primary data or secondary data, the decoding unit 18 changes over a decoding condition suitably in accordance with setting information of the decode parameter included in the data.

The display unit 20 displays the image developed in the frame memory. Accordingly, the outputting unit 26 includes a general display unit for displaying an image such as a liquid crystal display unit, an organic EL display unit, or a plasma display unit and a controller for controlling the display unit. Further, the display unit 20 may include a sound outputting apparatus which outputs a sound signal as acoustic sound such as a speaker, an earphone, or a headphone.

Figure 3:
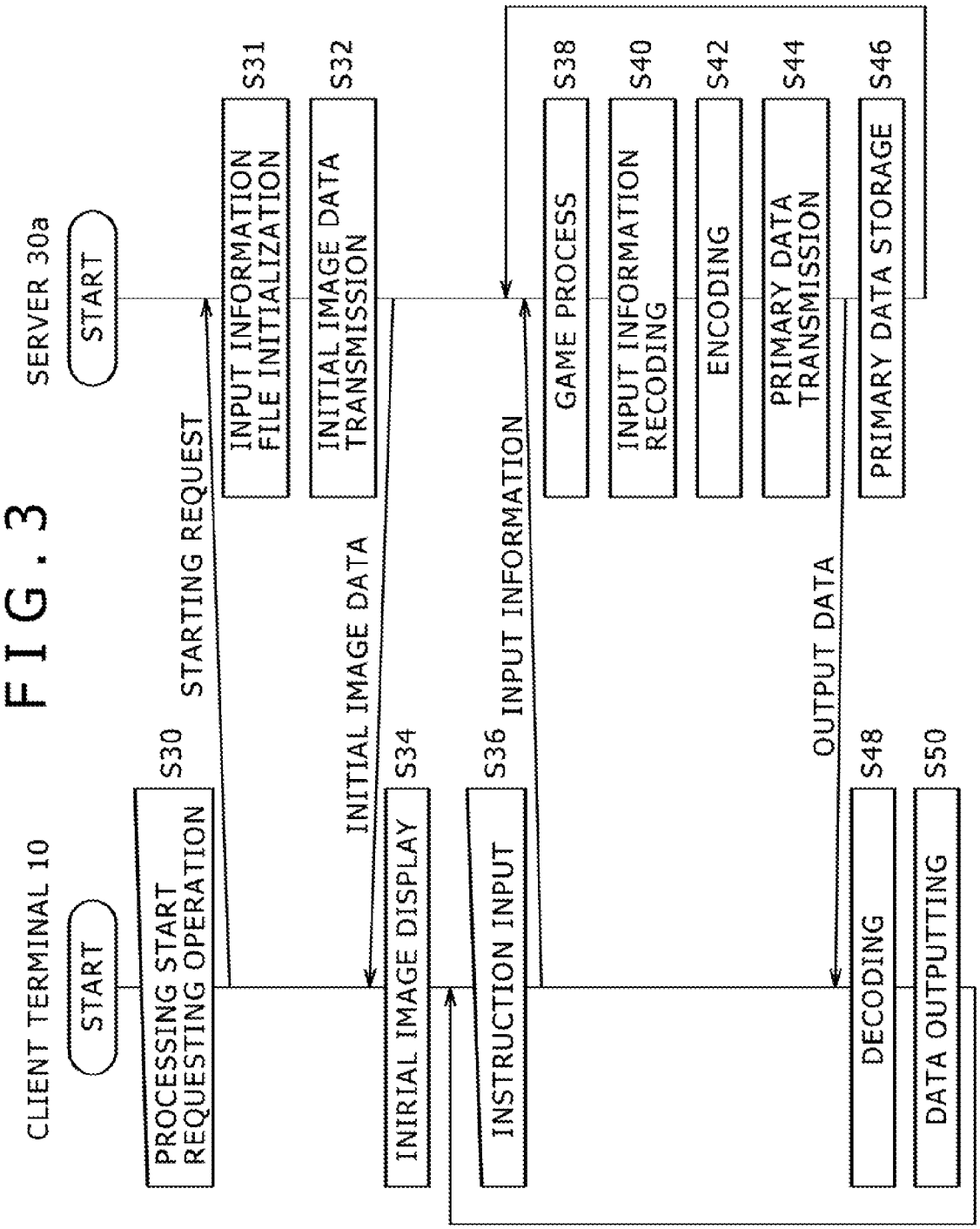
FIG. 3 is a flow chart illustrating a processing procedure in which the client terminal and the server progress a game during a game execution period in the present embodiment.

Now, operation of the system implemented by the configuration described above is described. FIG. 3 is a flow chart depicting a processing procedure when a client terminal 10 and the server 30*a* progress a game within a game execution period. Although FIG. 3 depicts a procedure of processing by a single client terminal 10 and the server 30*a*, a plurality of client terminals 10 may connect to the server 30*a* simultaneously, and in this case, the plurality of client terminals 10 progress processing similarly. Further, while such processes as generation, transmission, and outputting of data are represented as a single step, the step may have a time width depending upon processing contents, and in this case, it is assumed that processes progress in parallel suitably. This similarly applies also to the flow charts of FIGS. 5, 6, and 8 hereinafter described.

First, if a user carries out an operation for requesting starting of processing by designating a game name or the like to the inputting unit 12 of a client terminal 10 (S30), then the input information transmission unit 14 generates and transmits a signal for a processing start request to the server 30*a*. This signal includes necessary information such as identification information of the client terminal 10 and the user and a game name. When re-starting from a save point is to be requested, the signal includes information for identifying the game play of the re-starting target such as save time.

The input information reception unit 32 of the server 30*a* which receives the processing start request signal instructs the information processing unit 36 to start processing of the corresponding game and initializes an input information file stored in the input information storage unit 42 (S31). In particular, the input information reception unit 32 prepares a new file for recording the input information in an associated relationship with the identification information of the game play. If the input information is to be recorded in an associated relationship with an elapsed time period from the game start, then the input information reception unit 32 starts up a timer not depicted.

The information processing unit 36 starts processing by starting up a program of the designated game or the like. Then, generated data of an initial image are encoded by the encoding unit 38 and transmitted to the client terminal 10 by the data transmission unit 40 (S32). When the data reception unit 16 of the client terminal 10 receives the data of the initial image, the decoding unit 18 decodes the data, and the display unit 20 outputs the decoded data. Consequently, the initial image is displayed on the client terminal 10 (S34). It is to be noted that, where the data of the initial image are data having a time width such as data of a moving picture, the transmission process at S32 may be stream transfer, and the client terminal 10 successively decodes and displays the received data.

If the user carries out instruction inputting such as command inputting to the inputting unit 12 while watching the initial image displayed in such a manner as described above, then the input information transmission unit 14 transmits the input information to the server 30*a* every time (S36). When the server 30*a* receives the information, the input information reception unit 32 notifies the information processing unit 36 of the information, and consequently, the information processing unit 36 carries out processing of the game corresponding to the received input information (S38). The input information reception unit 32 further records the input information together with time into the input information file prepared in the input information storage unit 42 (S40). For example, the input information reception unit 32 records an elapsed time period from the game start measured by the own timer and the input information in an associated relationship with each other.

The encoding unit 38 of the server 30*a* encodes the data of the image generated as a result of the game processing by the information processing unit 36 (S42). The data transmission unit 40 transmits the image data after the encoding generated in this manner as primary data to the client terminal 10 (S44). When the data reception unit 16 of the client terminal 10 receives the image data, the decoding unit 18 decodes the image data (S48) and the display unit 20 displays the image data. Consequently, a game screen image corresponding to the user operation is displayed on the client terminal 10 (S50). By repeating the processes from S36 to S50, a mode in which the screen image is suitably updated and the game progresses in response to a user operation can be implemented.

FIG. 4 depicts an example of a data structure of the input information file stored in the input information storage unit 42. An input information file 70 includes a time field 72 and an input value field 74 and records input information representative of contents of an operation carried out for the client terminal 10 after the game start in an associated relationship with time. The input time to be recorded into the time field 72 is, in the case of FIG. 4, an elapsed time period after the game start. However, if a time series of operations is apparent, then the form of the input information is not restricted.

Further, in the case of FIG. 4, the input value field 74 has operation contents of the user recorded in the form of an identification number therein. For example, an identification number is applied to each operation means such as a button or a GUI of the inputting unit 12 of the client terminal 10, and the depressed operation means is recorded into the input value field 74. However, since a more detailed operation such as a time period for which depression continues or an operation direction is sometimes to be recorded, the recording form of input information in the input value field 74 is not limited to the depicted one. The input information reception unit 32 records the input information by adding a row of the input information file 70 every time input information is transmitted from the client terminal 10 within the game execution period.

Figure 5:
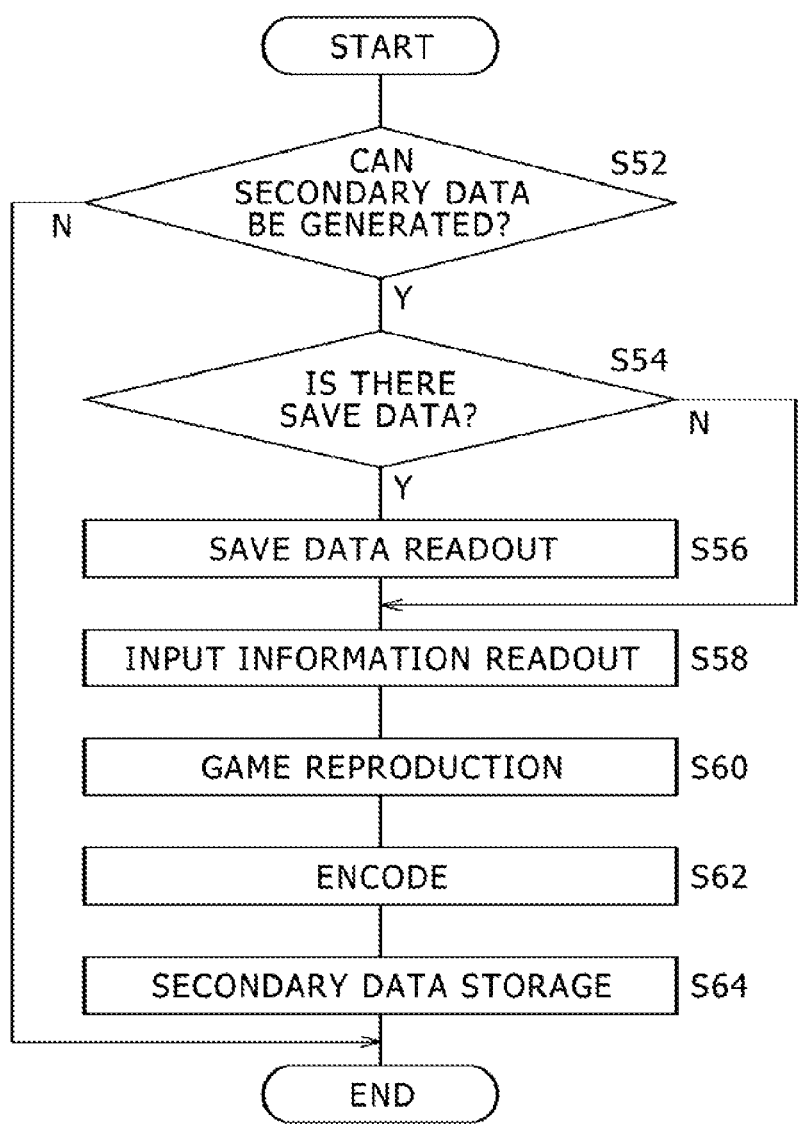
FIG. 5 is a flow chart illustrating a processing procedure in which the server generates secondary data in the present embodiment.

FIG. 5 is a flow chart illustrating a processing procedure by the server 30a for generating secondary data. The secondary data generation instruction unit 34 of the server 30a monitors resources of the information processing unit 36 and the encoding unit 38 to decide whether there is a sufficient room for generating secondary data (S52). In this process, the secondary data generation instruction unit 34 may actually confirm periodically, or the secondary data generation instruction unit 34 may receive a notification from the information processing unit 36 or the encoding unit 38 at a point of time at which a room greater than a reference value appears.

If there is not a room, then the secondary data generation instruction unit 34 waits as it is (N at S52). If a room is occurred (Y at S52), the secondary data generation instruction unit 34 selects identification information of a game play with regard to which secondary data are not generated as yet from the internal memory or the like and notifies the information processing unit 36 and the encoding unit 38 of the identification information to instruct them to generate secondary data. The information processing unit 36 reads out, if save data representative of a start point of the game play is stored in the save data storage unit 44, the save data (Y at S54, and S56). Further, irrespective of whether or not save data exist, the information processing unit 36 reads out an input information file associated with the identification information of the game play from the input information storage unit 42 (S58).

Then, if save data are read out (Y at S54), then the information processing unit 36 reproduces the game process from the save point, but if save data do not exist (N at S54), then the information processing unit 36 reproduces the game process from the beginning (S60). Along with this, the information processing unit 36 progresses the game deciding that the same operation is carried out at the same timing in accordance with input information recorded in the input information file. As a result, every time data of an image are generated, the encoding unit 38 encodes the data (S62).

The secondary data generated and encoded at S60 and S62 may have a resolution or a bit rate different from that of the primary data generated within the game execution period. For example, at S60, an image may be generated with a plurality of sizes in accordance with a resolution of a display image, such as standard definition (SD), high definition (HD), and full HD, supposed with the client terminal of the data transmission destination. Further, at S62, an image may be encoded by a plurality of methods. The encoding unit 38 stores the encoded secondary data into the output data storage unit 46 (S64). At this time, the primary data representative of the same game play is deleted from the output data storage unit 46 as occasion demands.

Figure 6:
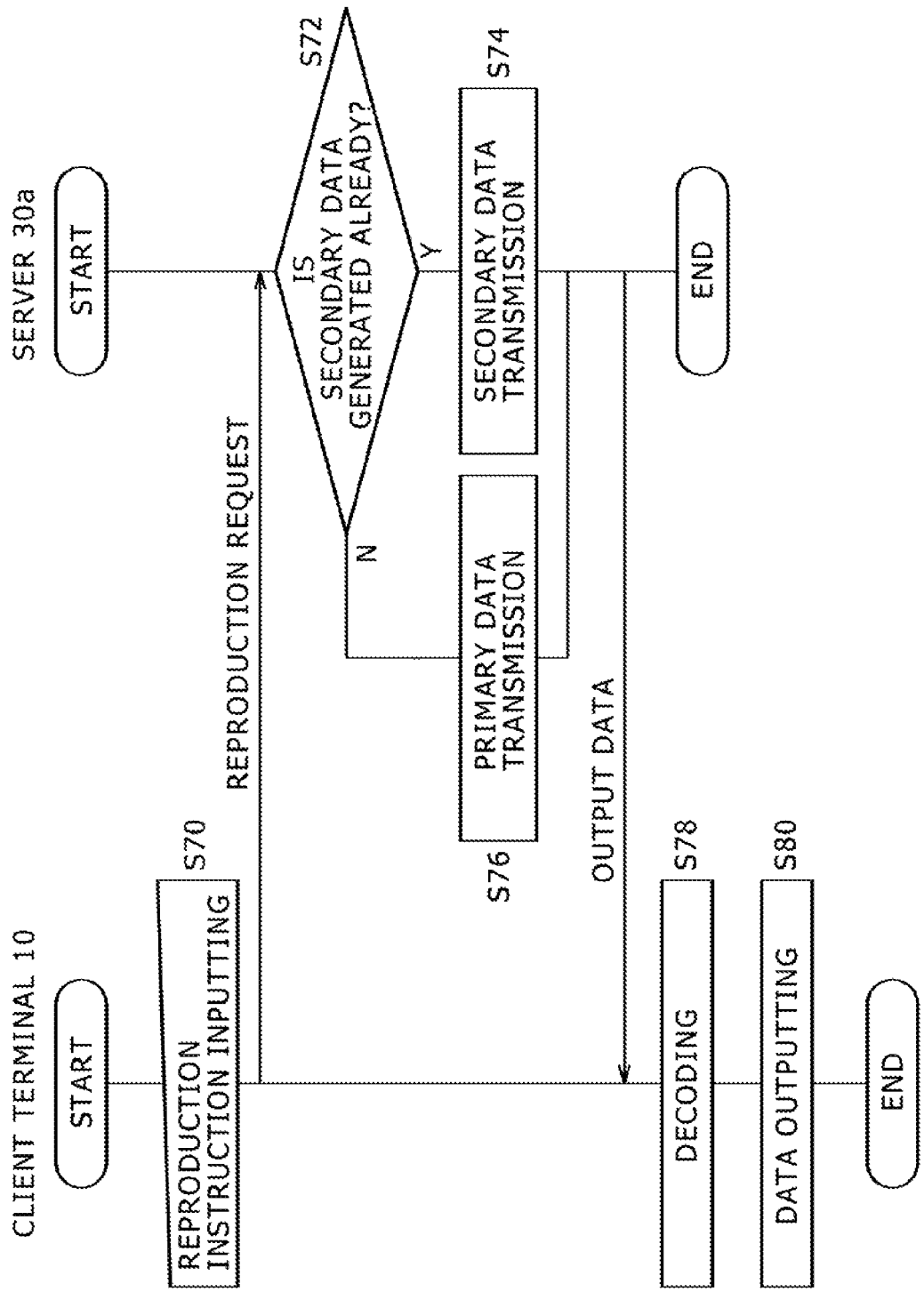
FIG. 6 is a flow chart illustrating a processing procedure of the client terminal and the server when a game play is reproduced in the present embodiment.

FIG. 6 is a flow chart illustrating a processing procedure of a client terminal 10 and the server 30a when a game play is reproduced. If a user such as an appreciator first carries out an operation for requesting reproduction by designating a game play of a reproduction target to the inputting unit 12 of the client terminal 10 (S70), then the input information transmission unit 14 generates and transmits a signal for reproduction request to the server 30a. The user may transmit data of a web page representative of a selection screen image of a game play being laid open or like data from the server 30a in advance in order to designate a game play. On the selection screen image, a game name, a player name, a play date and so forth are displayed together with thumbnail images of game screen images to facilitate selection by the user.

The reproduction request signal may further include a resolution of the display of the own apparatus, an encoding method to be requested and so forth. The input information reception unit 32 of the server 30a which receives the reproduction request specifies the identification information of the selected game play and conveys the identification information to the data transmission unit 40. The data transmission unit 40 confirms whether or not secondary data of the game play are stored in the output data storage unit 46 (S72). If such secondary data are stored (Y at S72), then the data transmission unit 40 reads out the secondary data and transmits the secondary data to the client terminal 10 of the requesting source (S74). Along with this, if the data are stored with a plurality of resolutions or encoding methods, the data transmission unit 40 selects data corresponding to the request from the client terminal 10 and transmits the selected data.

If secondary data are not stored (N at S72), then the data transmission unit 40 reads out and transmits the primary data to the client terminal 10 of the requesting source (S76). When the data reception unit 16 of the client terminal 10 receives the data, the decoding unit 18 decodes the data (S78) and the display unit 20 displays the decoded data. Consequently, the selected game play is displayed in the form of a moving picture or the like on the client terminal 10 (S80). By the processing procedures illustrated in FIGS. 3, 5, and 6, it is possible to give priority, within a game execution period, to the responsiveness but give priority, upon game play reproduction, to the picture quality.

In this manner, in the present embodiment, the quality can be set independently in response to a situation with regard to the same image of a game play. This advantage may be utilized more actively so that, upon execution of a game, the quality of image data is adjusted adaptively in response to a communication situation. By this, it is possible to display an image in high quality when the communication state is good in a state in which the responsiveness is secured. Also in this case, if secondary data are generated as described above, then the communication situation within an execution period does not have an influence on later reproduction.

FIG. 7 particularly depicts a configuration of the server 30 which further includes a function of adjusting information process or encoding process in response to a communication situation within a game execution period. A server 30b in FIG. 7 adjusts not only the quality of image data in response to a communication situation but also contents of the game themselves. By this, it is possible to suppress occurrence of such a situation that a user operation is detected after a delay caused by deterioration of the communication situation by the server 30 side and this acts unfavorably upon the user. It is to be noted that, in FIG. 7, blocks having same functions as those of the server 30a depicted in FIG. 2 are denoted by like reference characters and description of them is omitted suitably. Further, since the configuration of the client terminal 10 may be similar to that depicted in FIG. 2, illustration of the same in FIG. 7 is omitted.

The server 30b includes an input information reception unit 32, a secondary data generation instruction unit 34, an information processing unit 36, an encoding unit 38, a data transmission unit 40, an input information storage unit 42, a save data storage unit 44, and an output data storage unit 46. The functional blocks mentioned function basically similarly to the functional blocks included in the server 30a of FIG. 2. However, the information processing unit 36 includes an adjustment part 52 for adjusting processing by the information processing unit 36 and the encoding unit 38 in response to a communication situation. The server 30b further includes a communication situation monitoring unit 50 which monitors the communication situation of the client terminals 10 and an adjustment history storage unit 54 which records carried out adjustment contents in an associated relationship with time.

The communication situation monitoring unit 50 monitors the communication situation with the client terminal 10 within a game execution period. Although the communication situation can be represented by various parameters, at least one of such parameters as, for example, a free situation of a communication band, a packet loss rate, a delay time period, and a dispersion in delay time period is monitored. The packet loss rate represents a rate of packets which do not arrive at the server 30b from among packets sent out from the client terminal 10 for input information transmission or the like. For example, the client terminal 10 applies consecutive numbers to packets in the sending out order, and the server 30b detects loss of a number and counts the number of such lost packets to calculate a packet loss rate.

The delay time is the difference between input time of a user operation to the client terminal 10 or sending out time of a packet for transmitting the input information and time at which the input information is received by the server 30b. For example, a timestamp of input time of a user operation or sending out time of a packet is transmitted to the server 30 together with the input information, and the server 30 compares the timestamp with time at which the input information is received thereby to obtain a delay time period. The dispersion in delay time period is obtained by retaining a history of the delay time period into the server 30 and calculating the standard deviation of the variation at predetermined time intervals or the like.

The communication situation monitoring unit 50 determines a value of a parameter set as a monitoring target from among the parameters mentioned above at predetermined time intervals and notifies the adjustment part 52 of the information processing unit 36 of a result of the determination. The adjustment part 52 makes a decision regarding the necessity for adjustment on the basis of the value conveyed thereto and adjusts contents of a process by the information processing unit 36 in accordance with a rule determined in advance. Alternatively, the adjustment part 52 determines a value after the adjustment of an encode parameter to be used in processing by the encoding unit 38 and notifies the encoding unit 38 of the value. The information processing unit 36 progresses game processing under adjustment of the adjustment part 52. The encoding unit 38 changes the encode parameter in accordance with the notification from the adjustment part 52 to carry out encoding.

Here, the adjustment of processing contents is to adjust contents themselves of a game such as, for example, to moderate the rule of the game. For example, in a game in which a score is provided when depression of a game pad is carried out at an appropriate timing, the time period of the criterion for an appropriate timing is extended. This prevents such a situation that, although the game pad is depressed at an original appropriate timing, the server 30 decides that the timing is missed as a result of communication delay from the client terminal 10 to the server 30b and the user is disadvantaged.

Since the present embodiment has a configuration that an input to a client terminal 10 is accepted through a network and interpreted by the server 30b, particularly in a game in which the timing of a user operation has an influence on a result, the situation of the game is likely to be changed by a communication situation. Also it may be likely to occur that time is required before image display and, as a result, a next operation is delayed in addition to that the timing of a user operation is detected late by the server 30b as described above. Therefore, it is particularly effective to adjust the reference time period for determination of an appropriate timing in response to a communication situation as described above. However, the adjustment of the processing contents to be carried out by the adjustment part 52 is not limited to this, and the adjustment may be such adjustment for merely decreasing the difficulty as, for example, to decrease the number of enemies in a combat game or to make it liable to arrive at a destination upon movement of a character. A further particular example is hereinafter described.

Further, although the encode parameter representatively is a bit rate or an encoding method, it may be any parameter which can be adjusted in an encode process and is effective to reduction of the processing time period. In any of cases of adjustment of processing contents and adjustment of an encode parameter, the particular adjustment target may differ for each of contents of processes to be carried out by the information processing unit 36, namely, for each of contents or situations of a game, and may be determined in advance by a creator of the game. Further, in addition to whether or not adjustment is required, which adjustment is to be carried out, the degree of such adjustment and so forth may be adaptively changed in response to a communication situation.

The adjustment part 52 stores the determined adjustment contents into the adjustment history storage unit 54 in an associated relationship with adjustment time for each type of identification information of the game play. The adjustment time to be recorded here may be an elapsed time period after the game start or time such as standard time similarly as in the input information file stored in the input information storage unit 42. The adjustment part 52 reads out, when the information processing unit 36 reproduces a game to generate secondary data, a corresponding adjustment history from the adjustment history storage unit 54 on the base of the identification information of the game play and carries out adjustment same as that within a game adjustment period. By this, a manner of the game including that adjustment has been carried out is reproduced to generate secondary data.

A parameter which does not require reproduction thereof from among the parameters for which the adjustment is carried out is excluded from the adjustment target upon secondary data generation. For example, where the bit rate of the encoder is lowered to give priority to the transmission speed while the picture quality is sacrificed, the bit rate may not intentionally be lowered for the secondary data for which high picture is basically required. In this manner, for a parameter which does not require reproduction upon secondary data generation in this manner, the adjustment may not be recorded into the adjustment history storage unit 54.

Figure 8:
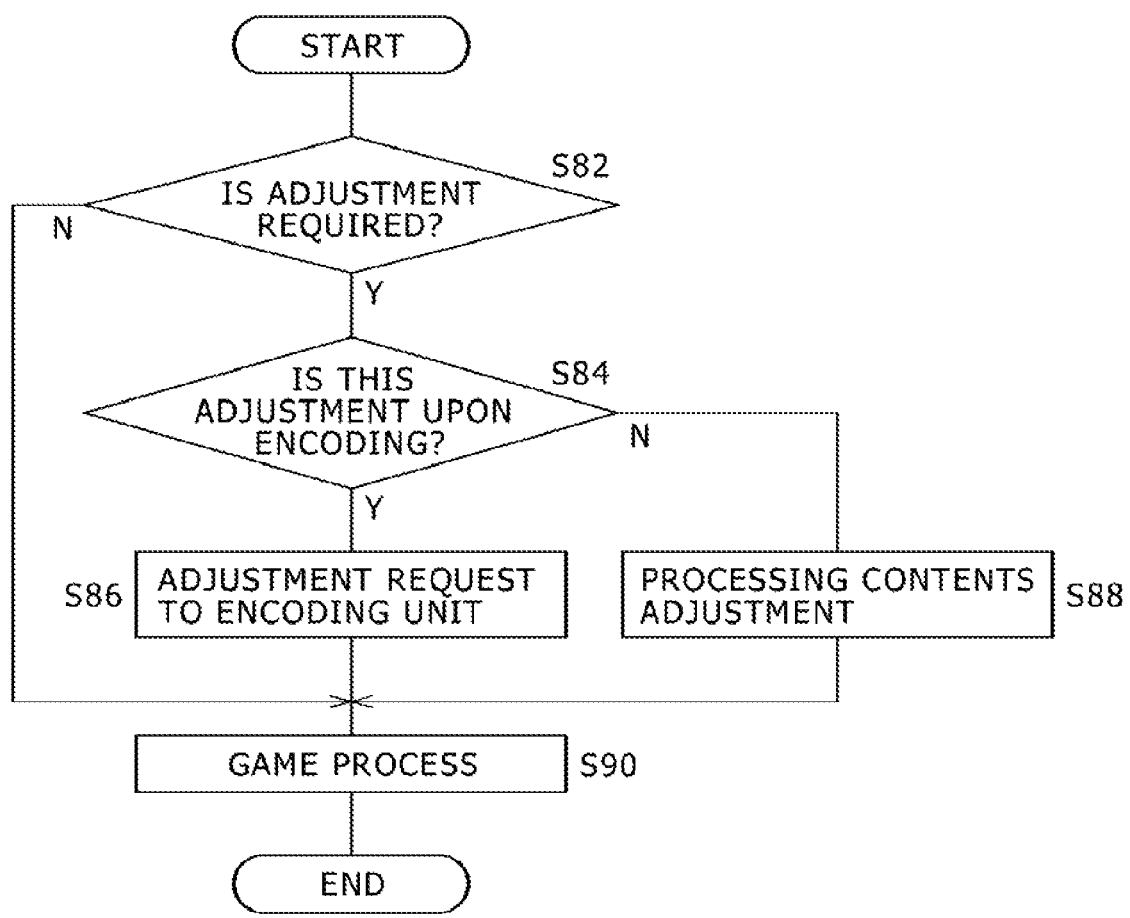
FIG. 8 is a flow chart illustrating a processing procedure when the server carries out an information process while it carries out adjustment in response to a communication situation in the present embodiment.

Now, operation of the server 30b having the configuration of FIG. 7 is described. FIG. 8 is a flow chart illustrating a processing procedure carried out by the server 30b for carrying out an information process while the server 30b carries out adjustment in response to a communication situation. By incorporating this flow chart into the process at S38 in the flow chart of FIG. 3, the game can be progressed while an adjustment function is implemented. First, if a parameter representative of a communication situation is successively inputted from the communication situation monitoring unit 50, then the adjustment part 52 compares the parameter with a reference set in advance to decide whether or not adjustment is required (S82). A reference may be set for each of adjustment contents such that adjustment contents to be carried out are selected in accordance with the reference.

It is to be noted that the decision of whether or not adjustment is required may be made by the communication situation monitoring unit 50. Within a range within which, even if the communication situation degrades, a packet loss or a dispersion in communication time caused by the deterioration of the communication situation can be adjusted by an existing technology and it can be determined that the influence had on the game is low, the adjustment may not be carried out. For example, as regards the packet loss, a lost packet can be restored by making the streaming redundant. Further, as regards the dispersion in communication time, the dispersed time can be absorbed by providing a buffer in the client terminal 10. Such mechanisms may be provided separately and utilized as a preceding step to the adjustment.

If there is no necessity for adjustment as a result of the decision at S82 (N at S82), then the game is continuously processed without adjustment (S90). If adjustment is required (Y at S82) and the adjustment contents to be carried out relate to an encode process such as reduction of the bit rate (Y at S84), then an adjustment request is issued to the encoding unit 38 together with particular adjustment contents such as a value after adjustment of the encode parameter (S86). If the adjustment target does not relate to an encode process (N at S84), then the contents themselves of the process by the information processing unit 36 are adjusted (S88). This process may actually be a process for changing over a set value for a rule of the moderation target or for branching the process to a different program prepared for the adjustment.

Then, in such an adjusted state as described above, the information processing unit 36 continuously processes the game (S90). It is to be noted that, while the flow chart of FIG. 8 illustrates an example in which one of adjustment of an encode parameter and adjustment of processing contents is carried out, both of the adjustments may be carried out depending upon settings. A plurality of references may be provided for a parameter indicative of a communication situation as described above such that, as the deterioration advances, the number of adjustment targets is increased. It is to be noted that, at S88, the resolution of a game image to be generated by the information processing unit 36 may be lowered.

Figure 9:
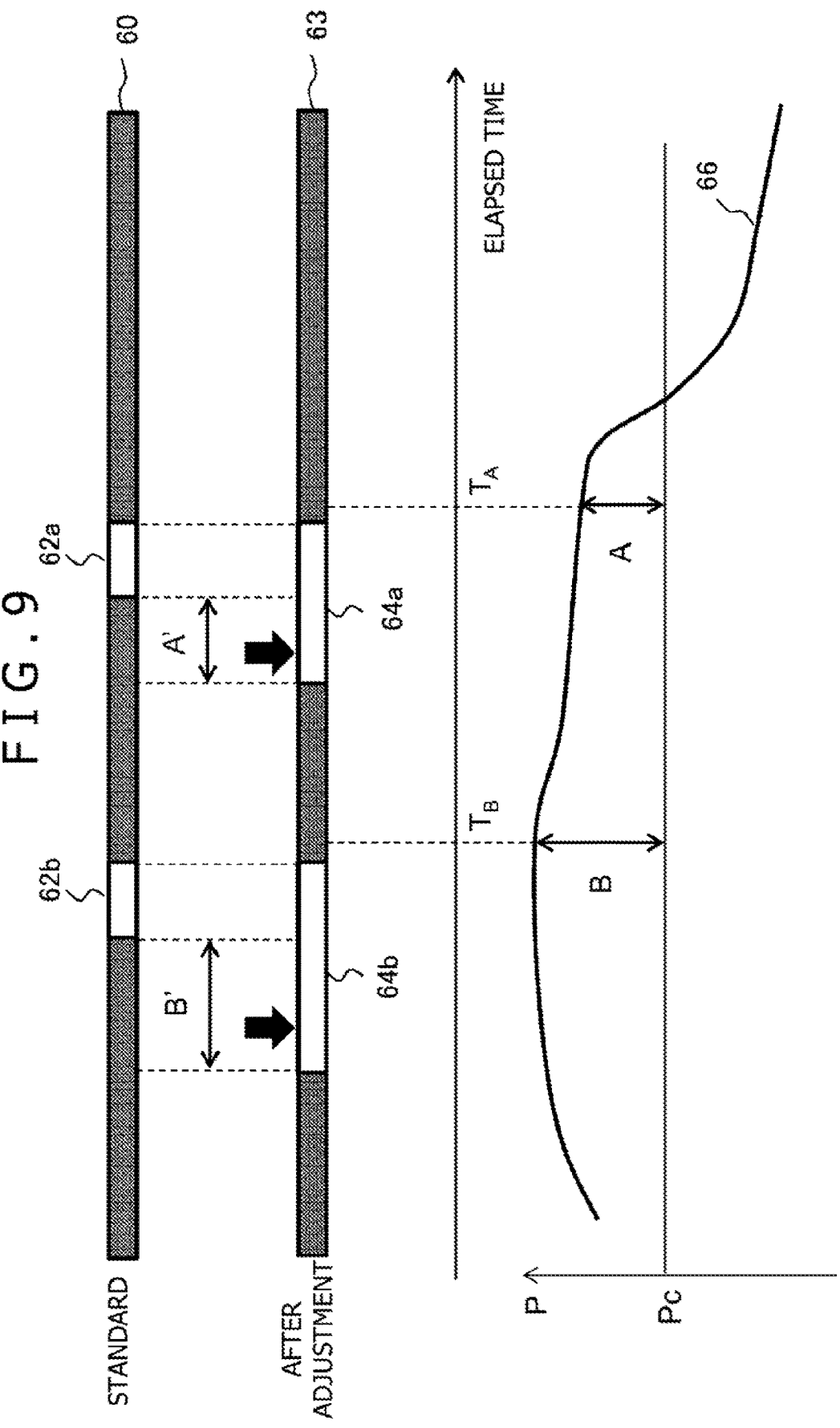
FIG. 9 is a view qualitatively illustrating adjustment of processing contents carried out by an adjustment part in the present embodiment.

FIG. 9 is a view qualitatively illustrating adjustment of processing contents to be carried out by the adjustment part 52. FIG. 9 supposes such a game that, for depression of a button or the like of a client terminal 10, a time period of a criterion (hereinafter referred to as "decision time period") which is considered to be an appropriate timing is successively set and a score is provided if depression within the decision time period is detected. As such a game as just described, a golf game in which the flying distance of a ball depends upon the swing-up amount of a golf club and the timing of the hitting of the ball, a game in which players compete for percussion playing techniques by depressing a game pad to fit the music, a fighting game in which a blow is given to an enemy in a virtual world by depression of a game pad and so forth are available.

FIG. 9 represents flows of a game (upper stage and middle stage) and a communication situation (lower sage) within the same time range. The axis of abscissa indicates elapsed time, and later time is represented from the left to the right. First, the upper stage represents a flow 60 of a game in a standard state in which no adjustment is carried out, and within time ranges each represented by a blank rectangle, decision time periods 62a and 62b are set. On the other hand, it is assumed that, upon execution of a game, a parameter P representative of a communication state varies to such a state as depicted by a graph 66 at the lowest stage. Here, a value Pc is a criterion for the requirement of adjustment, and if the criterion Pc is exceeded, then adjustment is required. At time $T_A$ and $T_B$, the parameter P exceeds the criterion Pc by A and B, respectively.

At this time, the adjustment part 52 extends, first at time $T_A$, the decision time period by an adjustment amount A' corresponding to the exceeding amount A. As a result, as depicted a flow 63 of a game at the middle stage, a decision time period 62a which comes at a timing immediately after then begins at the same time as the original decision time period 62a and is adjusted to a decision time period 64a extended by the adjustment amount A'. Similarly, at the time $T_B$, the decision time period is extended by an adjustment amount B' corresponding to the exceeding amount B. As a result, a decision time period 62b which comes at a timing immediately after then begins at the same time as the original decision time period 62b and is adjusted to a decision time period 64b extended by the adjustment amount B'. It is to be noted that also each of the start points of the decision time periods may be delayed by adjustment amounts corresponding to the exceeding amounts A and B.

Consequently, even if depression is detected at a timing of a thick arrow mark at which this is decided as a miss in the standard state, a score is given. As a result, occurrence of such a failure that, although depression is carried out at an appropriate timing on the client terminal 10, since detection by the server 30 is delayed by deterioration of the communication situation, the depression is determined to be a miss can be suppressed. A rule for determining the adjustment amounts A' and B' for the exceeding amounts A and B of the parameter P from the criterion Pc is set in advance in response to a variable to be selected as the parameter P, contents of a game and so forth.

For example, where the parameter P indicative of the communication situation is a delay time period, the adjustment amounts A' and B' may be set equal to the elapsed time periods A and B from the criterion Pc, respectively, or a constant may be added to the elapsed time periods A and B or the elapsed time periods A and B may be multiplied by a constant. Alternatively, adjustment may be carried out uniformly with an equal adjustment amount after the criterion Pc is exceeded. In FIG. 9, only the length of the decision time period is adjusted. However, under the ideal that deterioration of the communication situation does not give a disadvantage to a user, adjustment contents may vary in various manners depending upon the contents of a game.

For example, in a race game, adjustment of a decision time period and change of a process attendant to the adjustment may be carried out at the same time such that the movement of the vehicle is adjusted such that, even if the timing of a steering operation around a corner is delayed, if the delay remains within the decision time period after the adjustment, then an off-the-track decision may not be made. It is to be noted that, while FIG. 9 depicts an example in which a parameter P which increases as the communication situation degrades is used, if a parameter P having a reverse characteristic is used, then adjustment is carried out naturally when it becomes less than the criterion Pc.

Figure 10:
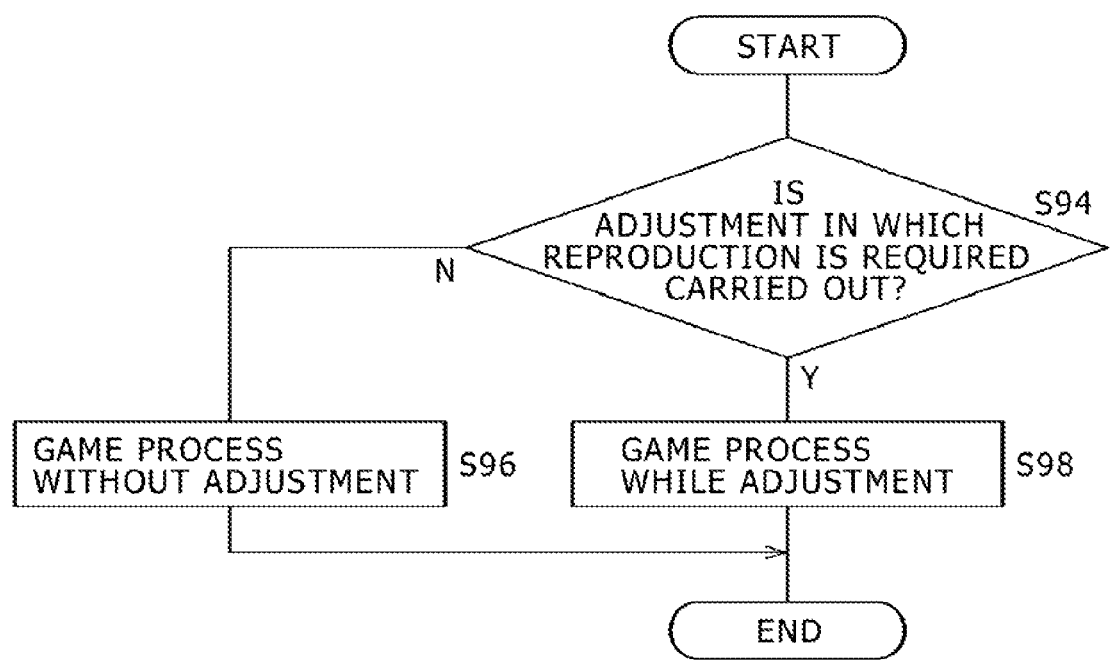
FIG. 10 is a flow chart illustrating a processing procedure of the server when adjustment contents are reproduced upon generation of secondary data in the present embodiment.

FIG. 10 is a flow chart illustrating a processing procedure of the server 30 when adjustment contents are reproduced upon generation of secondary data. By incorporating this flow chart into the process at S60 in the flow chart of FIG. 5, secondary data with an adjustment process taken into consideration can be generated. First, if a secondary data generation instruction is issued as described hereinabove with reference to FIG. 5, then the adjustment part 52 of the information processing unit 36 confirms whether or not adjustment which requires reproduction has been carried out during execution of a game play of a generation target (S94). Whether or not adjustment has been carried out can be decided depending upon whether or not there is an adjustment history by storing, during game execution, only a history of adjustment which requires reproduction into the adjustment history storage unit 54.

While the adjustment which requires reproduction in secondary data is adjustment of contents themselves of a process typically such as to moderate a rule of a game as described hereinabove, depending upon settings, also adjustment of an encode parameter may be reproduced. If adjustment which requires reproduction has not been carried out (N at S94), then adjustment by the adjustment part 52 is not carried out but the information processing unit 36 carries out processing of the game (S96). If adjustment has been carried out (Y at S94), then the adjustment part 52 reads out the adjustment history from the adjustment history storage unit 54 and carries out, during game processing by the information processing unit 36, same adjustment at the same timing as that of the actual adjustment (S98). For example, if the adjustment illustrated in FIG. 9 has been carried out, then the adjustment part 52 carries out adjustment to extend the decision time period by the adjustment amount A' or B' at time corresponding to the time $T_A$ or $T_B$ after the game is started in the secondary data generation process.

Figure 11:
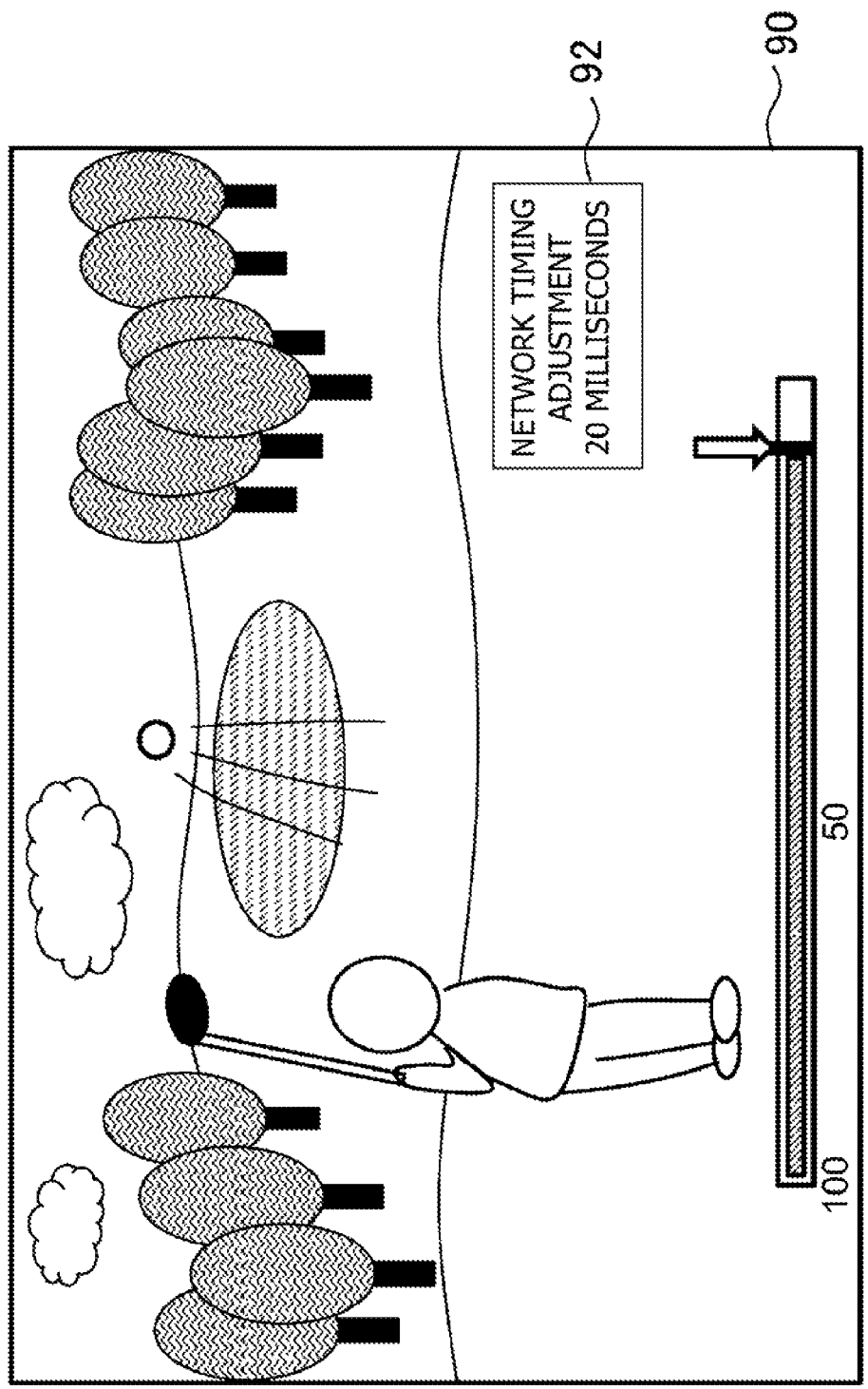
FIG. 11 is a view depicting an example of an image of secondary data in which adjustment contents are displayed in the present embodiment.

Except the adjustment, operation of the information processing unit 36 and the encoding unit 38 may be similar to that described hereinabove with reference to FIG. 5. Consequently, secondary data of high quality can be generated while primary data are traced accurately including also adjustment of rule moderation and so forth. It is to be noted that the adjustment history to be stored into the adjustment history storage unit 54 may be information which associates particular adjustment amounts such as the adjustment amounts A' and B' in the example of FIG. 9 with the adjustment time $T_A$, $T_B$ and so forth or a time variation of the parameter P representative of a communication situation. In the latter case, upon reproduction processing of the game, the adjustment part 52 derives the adjustment amounts again to reproduce the adjustment process.

Where the rule of the game is moderated in response to the communication situation in this manner, the user who watches the reproduction screen image may have a disagreeable feeling in that an operation at a timing which should originally be decided as a miss is decided as an appropriate operation. Along with this, the adjustment part 52 may display, upon secondary data reproduction, character information or the like representative of the adjustment contents in the image in addition to reproduction of the adjustment. FIG. 11 depicts an example of an image of secondary data whose adjustment contents are displayed.

An image 90 represents a scene of a golf game and is displayed on the display unit 20 of a client terminal 10 upon reproduction in which secondary data are used. In the present example, upon game execution, adjustment for extending the decision time period, in which a timing at which a golf club swung by an operation of the user hits upon a ball is decided appropriate is extended by 20 milliseconds is carried out. In this case, an image is generated such that, upon secondary data generation, when a decision of a ball hitting timing is decided according to the decision time period after the adjustment, a window 92 indicative of the adjustment contents is displayed for a predetermined period of time. In the example of FIG. 11, character information of "network timing adjustment 20 milliseconds" is displayed in an overlapping relationship on the game screen image.

Consequently, also a user other than the players can know the situation upon game execution and need not feel a suspicion about the correspondence between the ball hitting timing and the decision result of the same. It is to be noted that the display of the adjustment contents may be carried out for primary data. In particular, not only to the user who is playing the game but also to a user who is enjoying the game play on the real time basis, such information that the rule is moderated or to what degree the moderation is carried out may be disclosed. Further, the adjustment contents may be represented not only in character information but also by a graphic or by a color or a movement of the same.

The mode for moderating a rule described here is such that a user who is a player carries out an operation of a client terminal 10 as in an ordinary case and the decision time period is adjusted by the server 30b side in response to the communication situation. On the other hand, it may be a possible idea to adjust the operation itself of a user in response to the communication situation without changing the decision time period. In particular, a display for urging the user to hasten the operation timing taking the time period until input information arrives at the server 30b into consideration is carried out.

Figure 12:
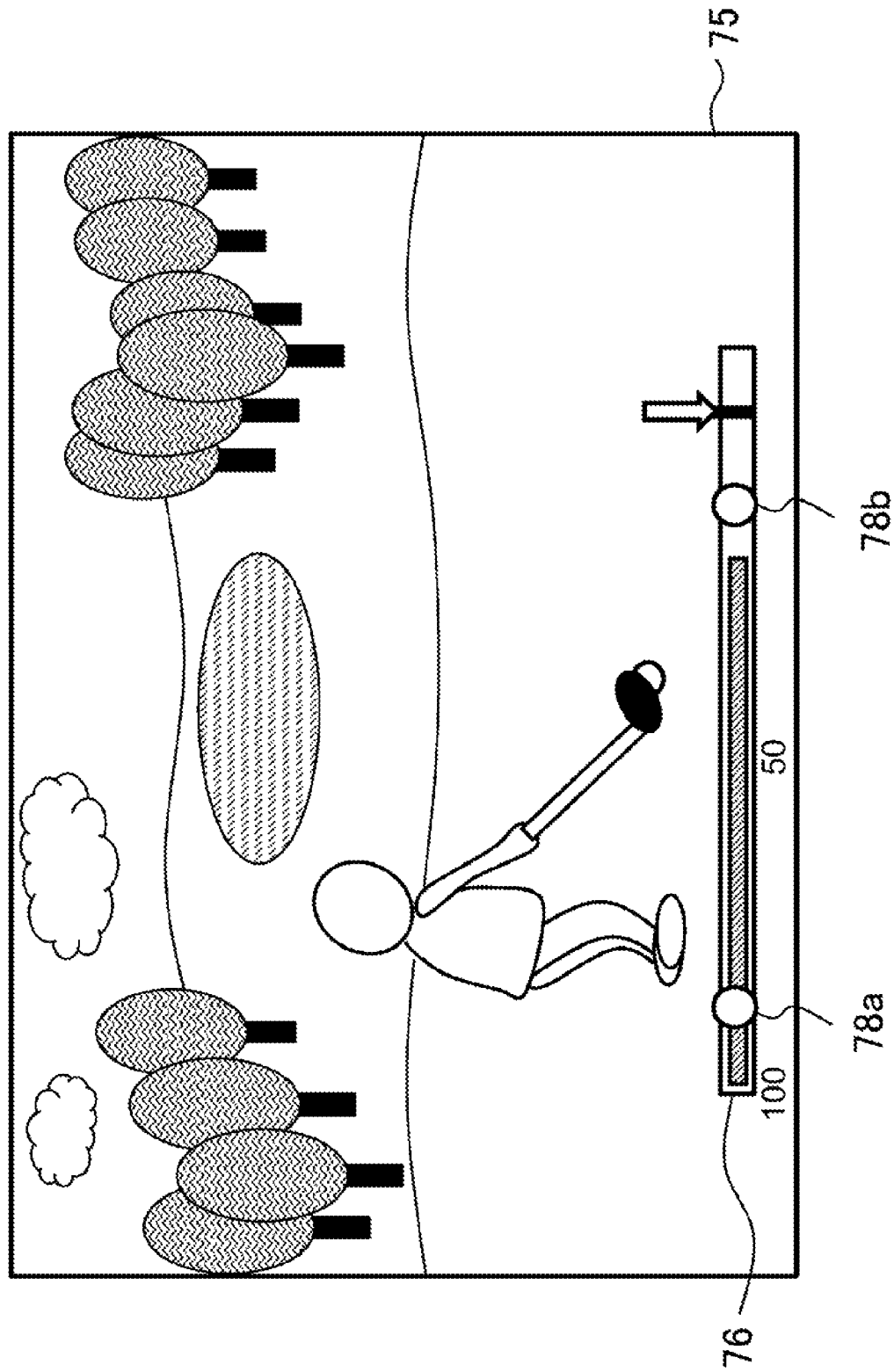
FIG. 12 is a view depicting an example of a game image in which a display image for urging a user to hasten the operation timing during execution of a game in the present embodiment.

FIG. 12 depicts an example of a game image in which a display for urging a user to hasten the operation timing is added during execution of a game. An image 75 represents a scene of a golf game similar to that of FIG. 11 and is displayed on the display unit 20 of the client terminal 10 during game execution.

In this golf game, in response to a series of movements of a back swing and a down swing of a golf club, timings of changeover of the swing direction and ball hitting are determined by depression operations of a game pad. Then, as a measure of a depression timing, a gauge 76 representative of a swing width of the club at the present point of time is displayed. The position denoted as "100" at the left end of the gauge 76 represents the swing width upon full swing, and the position indicated by an arrow mark in the proximity of the right end of the gauge represents the swing width upon just meet. The end edge of the index in the gauge moves, in response to the movement of the golf club, in the leftward direction during a back swing period and in the rightward direction during a down swing period.

When the flying distance is to be elongated by the full swing, in the standard state, the game pad is depressed with the swing width of the full swing, and preferably the game pad is depressed again with the swing width of the just meet. On the other hand, if the communication situation deteriorates, then it is necessary to hasten the depression timings taking the time period before detection by the server 30b into consideration. Therefore, the adjustment part 52 applies a mark 78a indicative of a timing suitable to carry out a swing direction changeover operation and a mark 78b indicative of a timing suitable to carry out a ball hitting operation to the gauge 76.

In particular, if the user operates so as to change over the swing direction at the timing of the mark 78a, then the server 30 detects the operation at the timing of the full swing. On the other hand, if the user carries out a ball hitting operation at the timing of the mark 78b, then the server 30 detects the operation at a timing of the just meet. By this, deterioration of the communication situation can be absorbed only by the adjustment of the operation timings without changing the decision time period. Even if this method is applied, since the difficulty itself of the game does not change very much, occurrence of a disadvantage to the user by deterioration of the communication situation can be suppressed. It is to be noted that, in the present mode, since no adjustment of the decision time period is carried out, an image of secondary data may be an ordinary image which does not display the marks 78a and 78b.

Figure 13:
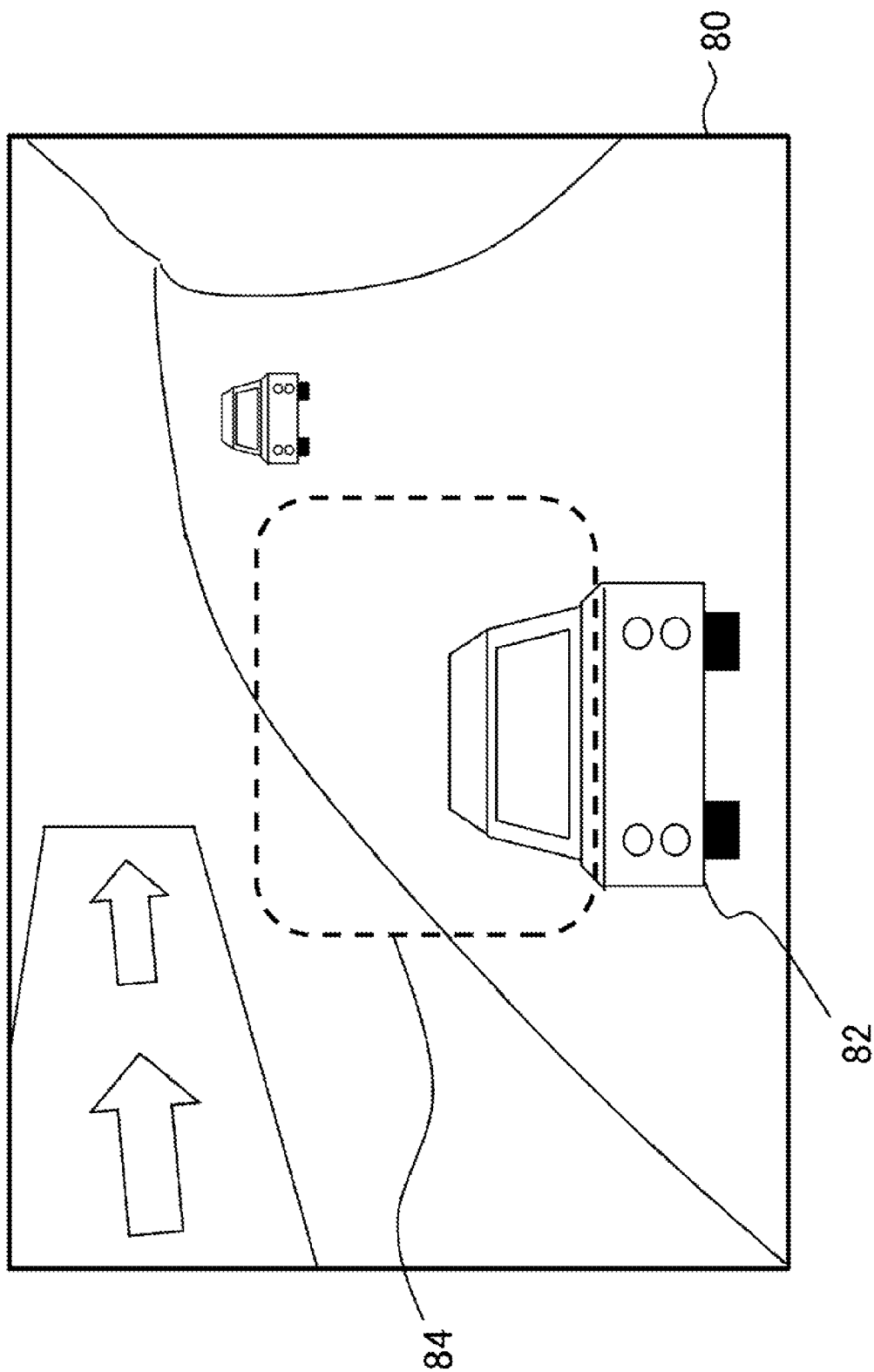
FIG. 13 is a view illustrating a mode in which an encode parameter is adjusted in the present embodiment.

FIG. 13 is a view illustrating a mode in which an encode parameter is adjusted by the process at S86 of the flow chart of FIG. 8. As the simplest example, it seems a possible idea that, when a situation appears in which adjustment is required, the bit rate of the entire image is lowered uniformly. On the other hand, even in one game image, where the quality or the degree of attention of information differs among different regions, it seems recommendable also to control the picture quality for each region. The example of FIG. 13 depicts a mode in which the bit rate is changed for each region in this manner.

An image 80 represents one scene of a car race game, and a user would operate a vehicle 82 that travels on a course in a virtual world. Where there is no requirement for adjustment, the entire image is encoded with the same bit rate. However, upon adjustment, a bit rate of a region 84 forwardly of the vehicle 82 with regard to which it is considered that the degree of attention is high, namely, within a predetermined range in the proximity of the center of the screen image, is left as it is, but the bit rate in the remaining region is lowered. The adjustment part 52 issues a notification of information relating to the position and the size of the region 84 and a bit rate of the remaining region after adjustment to the encoding unit 38 so that encoding is carried out by the encoding unit 38.

Consequently, upon game execution, the picture quality in the region in which there is high possibility that an operation of the user may be influenced can be maintained while the data size of an image to be transmitted to the client terminal 10 in response to deterioration of the communication situation is reduced. The size of the region 84 may be varied or the bit rate in the remaining region may be adjusted further in accordance with the degree of deterioration of the communication situation. Further, as occasion demands, also in the region 84, the bit rate may be lowered within a predetermined range. Further, the region 84 in which the bit rate is to be maintained may be moved in response to a change of the composition.

While FIG. 13 depicts an example of a race game, also in some other games, a region in which the bit rate is to be maintained as far as possible is determined in advance in response to contents of a game similarly such that the adjustment part 52 can refer to the region upon adjustment. As a region in which the bit rate is to be maintained, a region to which the degree of attention is high, a region in which important information is included, a region in which degradation of the picture quality has a bad influence on an operation of the user or the like may be applicable.

In particular, in the case of a game in which the user moves a character or a view point such as a roll playing game, a region within a predetermined range including the character, a region within a predetermined range in the proximity of the aim in first person shooting (FPS) or third person shooting (TPS), or a like region may be applicable. Further, a region in which character information of a stage or a score at present, text chatting or the like is displayed, a region of a popup window displayed during game play, a region which newly enters a view field when a virtual view point is moved by a user operation or alike region may be applicable.

With the present embodiment described above, in a system in which a game image is generated on a server side in response to a user operation on a client terminal and data of the generated image are transmitted to the client terminal, contents of the user operation are recorded on the server side. Then, the game is executed again at a suitable timing on the basis of the recorded contents of the user operation to re-generate and store a game image, and the game image is used when it is to be shared by a plurality of users or it is re-confirmed. Consequently, upon first-time execution and upon re-execution, the quality of an image and so forth can be controlled independently while the manner of the game is same. Thus, a service can be provided under optimum conditions in response to the situation.

In particular, upon first-time execution, the resolution and the bit rate upon encoding are suppressed low giving priority to the responsiveness, but upon re-execution, since there is no restriction time, a resolution and a bit rate higher than those are used. Consequently, both of the responsiveness desired by the player upon first-time execution and the quality of an image desired by the viewer upon game reproduction can be satisfied. Further, upon re-execution, priority is given to the compression rate rather than processing time period of encoding. Consequently, the size itself of image data can be decreased, and this can contribute also to saving of the communication band upon reproduction and of the storage region in the server.

Further, upon first-time execution, processing contents such as a rule of a game or a resolution of an image to be generated and an encode parameter such as a bit rate are adjusted in response to the communication situation. Consequently, such a disadvantage to a player that the responsiveness is deteriorated and the score does not extend by deterioration of the communication situation can be reduced. Further, since the resolution and the bit rate need not be reduced from the beginning in preparation for deterioration of the communication situation, in a state in which the communication situation is good, even if a game is being executed, display of high picture quality can be implemented. Even if the resolution and the bit rate are adjusted upon first-time execution, then, by re-generating an image by re-execution, the picture quality upon reproduction is not influenced. As a result, a system capable of satisfying both the needs of players and the needs of viewers can be implemented irrespective of the communication situation.

The present invention has been described above with reference to the embodiment. The embodiment is exemplary, and it will be understood by those skilled in the art that various modifications can be made to the combination of the components and processes and that the modifications fall within the scope of the present invention.

For example, while the server 30b depicted in FIG. 7 includes both of the adjustment function in response to a communication situation and the generation function of secondary data, the server may include only the former one of the functions. Even with such a server as just described, upon game execution, an image can be displayed with high picture quality as high as possible while deterioration of the responsiveness caused by deterioration of the communication situation is prevented.

DESCRIPTION OF THE REFERENCE NUMERALS

1 Information processing system, 10 Client terminal, 12 Inputting unit, 14 Input information transmission unit, 16 Data reception unit, 18 Decoding unit, 20 Display unit, 30 Server, 32 Input information reception unit, 34 Secondary data generation instruction unit, 36 Information processing unit, 38 Encoding unit, 40 Data transmission unit, 42 Input information storage unit, 44 Save data storage unit, 46 Output data storage unit, 50 Communication situation monitoring unit, 52 Adjustment part, 54 Adjustment history storage unit.

INDUSTRIAL APPLICABILITY

As described above, the present invention can be utilized for an information processing system, a proxy server, and an information processing service such as cloud computing.

The invention claimed is:

1. An output data providing server which connects to a client terminal through a network and receives information relating to a user operation on the client terminal to carry out an information process and then transmits output data obtained as a result of the information process to the client terminal which requests the output data, comprising:
an input information reception unit configured to acquire information relating to the user operation as input information;
an information processing unit configured to carry out an information process on a basis of the input information to generate output data; and
a data transmission unit configured to transmit the output data to the client terminal, wherein
the information processing unit adaptively adjusts at least one of contents of the information process and quality of the output data in response to a communication situation with the client terminal, and
the information processing unit carries out an information process making progress of a game in response to the user operation and adjusts contents of the information process so as to moderate a rule of the game when the communication situation deteriorates by a sufficient amount from a predetermined reference.

2. The output data providing server according to claim 1, wherein the information process making progress of the game includes a decision process regarding whether or not an operation timing by the user is detected within a predetermined decision time period, and, when the communication situation deteriorates by the sufficient amount from the predetermined reference, provides a display to an image of the game included in the output data, which urges the user to provide an operation at a timing earlier than that existing prior to the deterioration of the communication situation.

3. The output data providing server according to claim 1, wherein the information processing unit:
encodes the generated output data with the adaptively adjusted quality and supplies the encoded data to the data transmission unit, and
encodes the output data with predetermined quality irrespective of whether or not the adjustment is carried out and stores the encoded data into a storage apparatus in preparation for later transmission to the client terminal.

4. The output data providing server according to claim 1, wherein the information processing unit partially lowers a resolution or a bit rate of an image included in the output data, when the communication situation deteriorates by the sufficient amount from the predetermined reference.

5. A method, comprising:
communicating, via an output data providing server, with a client terminal through a network;
receiving information at the data providing server relating to a user operation on the client terminal;
carrying out an information process based on the information and transmitting output data obtained as a result of the information process to the client terminal which requests the output data;
acquiring information relating to the user operation as input information;
carrying out the information process on a basis of the input information to generate the output data; and
transmitting the output data to the client terminal, wherein
the information process includes adaptively adjusting at least one of contents of the information process and quality of the output data in response to a communication situation with the client terminal, and
the information process includes making progress of a game in response to the user operation and adjusting contents of the information process so as to moderate a rule of the game when the communication situation deteriorates by a sufficient amount from a predetermined reference.

6. The method according to claim 5, wherein the information process making progress of the game includes a decision process regarding whether or not an operation timing by the user is detected within a predetermined decision time period, and, when the communication situation deteriorates by the sufficient amount from the predetermined reference, provides a display to an image of the game included in the output data, which urges the user to provide an operation at a timing earlier than that existing prior to the deterioration of the communication situation.

7. The method according to claim 5, wherein the information process includes:
   encoding s the generated output data with the adaptively adjusted quality and supplies the encoded data for transmission to the client terminal, and
   encoding the output data with predetermined quality irrespective of whether or not the adjustment is carried out and stores the encoded data into a storage apparatus in preparation for later transmission to the client terminal.

8. The method according to claim 5, wherein the information process includes partially lowering a resolution or a bit rate of an image included in the output data, when the communication situation deteriorates by the sufficient amount from the predetermined reference.

9. A non-transitory, computer readable storage medium containing a computer program, which when executed by a computer system, causes the computer system to carry out actions, comprising:
   communicating, via an output data providing server, with a client terminal through a network;
   receiving information at the data providing server relating to a user operation on the client terminal;
   carrying out an information process based on the information and transmitting output data obtained as a result of the information process to the client terminal which requests the output data;
   acquiring information relating to the user operation as input information;
   carrying out the information process on a basis of the input information to generate the output data; and
   transmitting the output data to the client terminal, wherein
   the information process includes adaptively adjusting at least one of contents of the information process and quality of the output data in response to a communication situation with the client terminal, and
   the information process includes making progress of a game in response to the user operation and adjusting contents of the information process so as to moderate a rule of the game when the communication situation deteriorates by a sufficient amount from a predetermined reference.

10. The non-transitory, computer readable storage medium according to claim 9, wherein the information process making progress of the game includes a decision process regarding whether or not an operation timing by the user is detected within a predetermined decision time period, and, when the communication situation deteriorates by the sufficient amount from the predetermined reference, provides a display to an image of the game included in the output data, which urges the user to provide an operation at a timing earlier than that existing prior to the deterioration of the communication situation.

11. The non-transitory, computer readable storage medium according to claim 9, wherein the information process includes:
   encoding s the generated output data with the adaptively adjusted quality and supplies the encoded data for transmission to the client terminal, and
   encoding the output data with predetermined quality irrespective of whether or not the adjustment is carried out and stores the encoded data into a storage apparatus in preparation for later transmission to the client terminal.

12. The non-transitory, computer readable storage medium according to claim 9, wherein the information process includes partially lowering a resolution or a bit rate of an image included in the output data, when the communication situation deteriorates by the sufficient amount from the predetermined reference.

* * * * *